(12) United States Patent
Jha

(10) Patent No.: US 7,844,920 B2
(45) Date of Patent: Nov. 30, 2010

(54) MODULAR ENTERTAINMENT SYSTEM WITH MOVABLE COMPONENTS

(75) Inventor: Hemant Jha, Los Angeles, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 1061 days.

(21) Appl. No.: 11/539,081

(22) Filed: Oct. 5, 2006

(65) Prior Publication Data
US 2008/0126927 A1  May 29, 2008

Related U.S. Application Data

(60) Provisional application No. 60/771,967, filed on Feb. 9, 2006.

(51) Int. Cl.
*G06F 13/00* (2006.01)
*G06F 15/00* (2006.01)

(52) U.S. Cl. ........................ 715/858; 345/173

(58) Field of Classification Search ......... 715/763–765, 715/715–717, 770–773, 851–853, 858, 740–742; 345/173, 175
See application file for complete search history.

(56) References Cited

U.S. PATENT DOCUMENTS

| | | | |
|---|---|---|---|
| 5,524,195 | A | 6/1996 | Clanton et al. |
| 6,259,436 | B1 | 7/2001 | Moon et al. |
| 6,504,530 | B1 * | 1/2003 | Wilson et al. ............... 345/173 |
| 6,710,754 | B2 | 3/2004 | Hanson et al. |
| 6,714,215 | B1 | 3/2004 | Flora et al. |
| D516,082 | S | 2/2006 | Lewis |
| 7,176,902 | B2 | 2/2007 | Peterson et al. |
| 2002/0109678 | A1 | 8/2002 | Marmolin et al. |
| 2003/0090504 | A1 * | 5/2003 | Brook et al. ................ 345/716 |
| 2006/0007151 | A1 | 1/2006 | Ram |
| 2006/0107295 | A1 * | 5/2006 | Margis et al. ................. 725/81 |
| 2006/0178215 | A1 * | 8/2006 | Lehikoinen et al. .......... 463/39 |
| 2006/0259877 | A1 * | 11/2006 | Kaminagayoshi .......... 715/858 |
| 2006/0291506 | A1 * | 12/2006 | Cain .......................... 370/486 |

OTHER PUBLICATIONS

H. Jha, U.S. Appl. No. 29/250,027, filed Oct. 31, 2006.

(Continued)

*Primary Examiner*—Kevin Nguyen
(74) *Attorney, Agent, or Firm*—Fitch, Even, Tabin & Flannery

(57) ABSTRACT

A system for playing audio content, visual content, or audio-visual content includes a base panel that incorporates loudspeakers, amplifiers, a display/control surface, charging circuitry for any objects placed upon the display surface, and capacitive sensors to display and control the user interface. Also included are one or more portable units having housings in the shape of aesthetically-pleasing structures. These portable units include data storage components (such as hard disk drives, optical drives, flash memories, etc.) for storing the content to be played, and incorporate electronics within but have no visible controls. As the portable units are placed at any location on the display surface, a GUI automatically appears under and around the units, indicating content, controls, etc. Commands can be entered on the GUI for controlling the transfer of the content from or to the portable units and for controlling the playing of the content by the base panel.

22 Claims, 5 Drawing Sheets

OTHER PUBLICATIONS

Sakai and Jha,U.S. Appl. No. 11/539,547, filed Oct. 6, 2006.

Sensetable: A Wireless Object Tracking Platform for Tangible User Interfaces; Publ. Proceedings of CHI 2001, Mar. 31-Apr. 5, 2001, ACM Press; James Patten et al.

Collaborative knowledge building by smart sensors; BT Technology Journal, vol. 22, No. 4, Oct. 2004 issue; VM Bove Jr. and J. Mallett.

Audiopad: A Tag-based Interface for Musical Performance, NIME 02 Paper, May 24-26, 2002; James Patten et al.

Bang & Olufsen; BeoCenter 2, undated product web page: www.bang-olufsen.com/web2/systems.

Object-Based Media, Spring 2006; Object-Based Media Group, MIT Media Laboratory web page; www.media.mit.edu.

Sensetable, MIT Tangible Media Group/Projects-Sensetable; James Patten et al. undated web page: http://tangible.media.mit.edu/projects/sensetable.

USPTO Final Office Action from U.S. Appl. No. 11/539,547 mailed Jan. 29, 2009.

Int'l Searching Authority, , International Search Report and Written Opinion of the International Searching Authority for PCTUS0780253 mailed Sep. 19, 2008.

Examiner's Answer to Appeal Brief from U.S. Appl. No. 11/539,547 mailed Dec. 28, 2009.

* cited by examiner

MODULAR ENTERTAINMENT SYSTEM WITH MOVABLE COMPONENTS

CROSS REFERENCE TO RELATED APPLICATIONS

This application claims priority from U.S. Provisional Application No. 60/771,967, filed Feb. 9, 2006, which is incorporated herein by reference.

FIELD OF INVENTION

This relates to a system and method for playing audio content, visual content, and audio-visual content by use of a computer and one or more portable storage units.

BACKGROUND

Component electronics for entertainment systems typically include multiple, free-standing enclosures that receive power and signals from interconnection wiring and communicate with other components via cables. Support for numerous components frequently is provided by furniture called consoles or entertainment centers. A typical entertainment center may have open shelving and enclosed shelving for supporting and enclosing the components. Such furniture also frequently provides holes through rear panels and through the shelving for accommodating the signal and power cables associated with the components.

A typical audio entertainment system includes a receiver, an amplifier, an optical storage device player (e.g., a CD or DVD player), a hard disk drive storage device, a sub-woofer, a plurality of speakers, etc. Receivers often are capable of playing back standard stereo programming (such as standard music CDs, FM broadcasts, etc.) as well as surround-sound for home theaters (such as with DVD's). A receiver can serve as a controller for all of the components, and can process a plurality of independent channels of audio. In some systems two or more of these components are housed in a combined enclosure. Other systems are more modular with each component having its own housing.

Generally, each of the components in an entertainment system is rectangular or box-shaped and is interconnected to the other components via a system of cables. Each component typically has one or more knobs, dials, levers, buttons or other electro-mechanical controls for operation of the system. Regardless of whether the entertainment system is turned on or off, the purpose or functionality of the box-shaped components with electro-mechanical controls is readily apparent. Thus known home entertainment systems and devices generally are shaped and behave like the electronic devices that they are. Regardless of price and level of sophistication of their design and implementation, these systems retain a traditional appliance shape even when not in use.

SUMMARY OF THE ILLUSTRATED EMBODIMENTS

A system for playing audio content, visual content, or audio-visual content is provided. According to one embodiment of the invention, a base panel or computer incorporates loudspeakers, amplifiers, a display/control surface, charging circuitry for any objects placed upon the display surface, and capacitive sensors to display and control a user interface. Also included are one or more portable units having housings in the shape of aesthetically-pleasing structures. These portable units include data storage components (such as hard disk drives, optical drives, flash memories, etc.) for storing the content to be played, and incorporate electronics within but have no visible controls. As the portable units are placed at any location on the display surface, a graphical user interface (GUI) automatically appears under and around the units, indicating content, controls, etc. Commands can be entered on the GUI for controlling the transfer of the content from or to the portable units and for controlling the playing of the content by the base panel.

According to another embodiment of the invention, the system comprises a media player program for playing the content, a computer adapted to execute the media player program, and a portable unit adapted for wireless communications with the computer. The computer includes circuitry for use in playing the content and a touchscreen display responsive to a user input device and in electrical communication with the circuitry. The touchscreen display has a horizontal display surface and is adapted for presenting a graphical user interface (GUI) configured for operation of the computer.

The GUI appears on the touchscreen display in response to the placement of the portable unit on any location on the display surface. The portable unit, which is controlled by commands entered on the GUI, is adapted to store the content and to wirelessly transfer the content to the computer.

In another aspect, the portable unit has a housing that is in the shape of a smooth-edged stone. The portable unit further has no electro-mechanical control for controlling its operation.

In another aspect, the computer further includes a base unit that encloses the circuitry, wherein the touchscreen display is mounted on the base unit. The base unit has no electro-mechanical control for controlling the selection of the content to be played or the operation of the portable unit.

In yet another aspect, the portable unit includes either a hard disk drive, an optical drive, or a flash memory. Alternatively, the portable unit is a portable audio player having a hard disk drive or a flash memory.

There are additional aspects to the present inventions. It should therefore be understood that the preceding is merely a brief summary of some embodiments and aspects of the present inventions. Additional embodiments and aspects are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

BRIEF DESCRIPTION OF THE DRAWINGS

These and/or other aspects and advantages of the present invention will become apparent and more readily appreciated from the following description of certain embodiments, taken in conjunction with the accompanying drawings of which.

DETAILED DESCRIPTION

Figure 1:
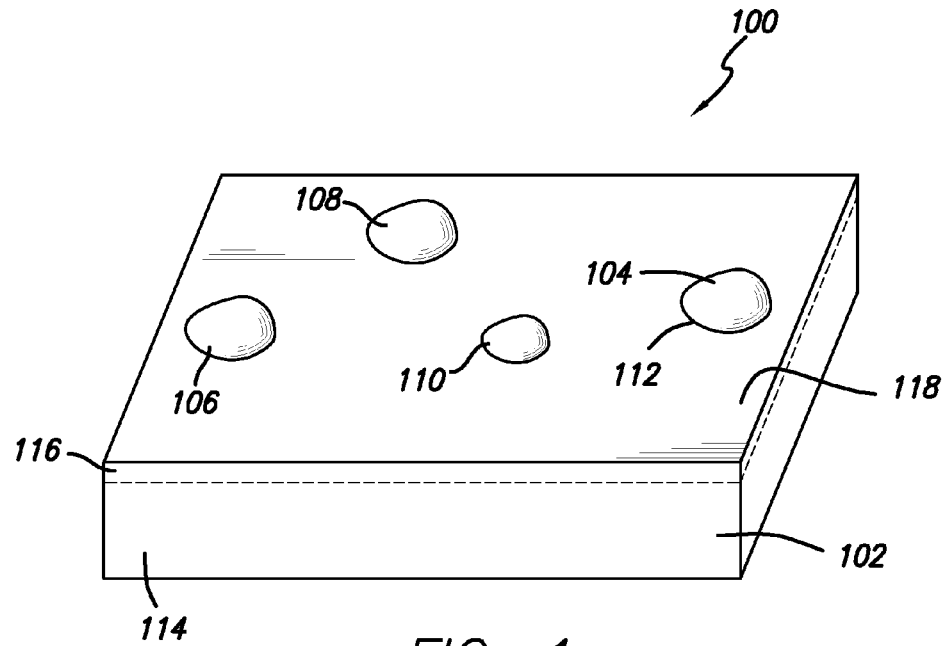
FIG. 1 is a simplified schematic view of a system including computer for playing audio content according to an embodiment of the invention.

The following description is of the best mode presently contemplated for carrying out the invention. Reference will be made in detail to embodiments of the present invention, examples of which are illustrated in the accompanying drawings, wherein like reference numerals refer to like elements throughout. It is understood that other embodiments may be used and structural and operational changes may be made without departing from the scope of the present invention.

Previously-known entertainment systems and devices are shaped and behave like the electronic devices that they are. These systems retain a traditional appliance shape, even when not in use. However, embodiments of the present invention include elegant control solutions that bypass the need for elaborate and menu laden controls. An electronic entertainment system in design and function is provided with a level of sophistication whereby the object appears purely sculptural, the interface is intuitive, and when not in use, there is no indication of the function of the system.

Embodiments of the invention include a computer-based device, such as an active/intelligent base, for playing audio content, visual content or audio-visual content. This base incorporates loudspeakers, amplifiers, a display/control surface, charging circuitry for any objects place upon the display surface, and capacitive sensors to display and control the user interface. Also included are one or more portable units having housings in the shape of aesthetically-pleasing structures, such as for example, the shape of a natural river stone, i.e., a rock or stone with smooth, curved surfaces and no sharp edges.

These portable units include data storage components (such as hard disk drives, optical drives, flash memories, etc.), for storing the content to be played, and incorporate electronics within but have no visible controls. As the portable units (e.g., the "stones") are placed at any location on the display surface of the base, a GUI automatically appears under and around the units, indicating content, controls, etc. The portable units may also easily be picked up and carried by a user to another location. In one embodiment, a portable unit is an audio player that can fit in a user's pocket or purse, etc. When not in use, the system takes on a sculptural quality having no obvious electronic function, thus providing an aesthetically-pleasing but functional entertainment system.

The portable units contain the content that is accessed via the base. When a unit is placed in any location on the base display surface, the GUI automatically lights up on the same display under and around the portable unit, displaying controls and content associated with this unit. The portable units can also communicate with each other wirelessly, enabling transfer of content from, for example, an optical drive in one portable unit to a hard disk drive in another portable unit, or from the hard disk drive to a portable flash memory player in yet another portable unit, etc.

The portable units have no controls on them, and they do not change in appearance when they are being used, except that in some embodiments a logo illuminates from within during use. The logo vanishes when the portable units are dormant, thus making the system appear like a sculptural installation.

Because the portable units are movable components that can easily be carried in one hand of a user, they can be manually carried to another location and used with another base panel located in another room. The portable units derive their control and power from the base, and therefore there are no wires, etc. that must be handled by a user.

Referring to FIG. 1, shown is a system 100 for playing audio content according to one embodiment of the invention. Shown is a computer 102, a first portable unit 104, a second portable unit 106, a third portable unit 108 and a fourth portable unit 110.

The computer 102 is a specialized computer in the form of an audio player and is adapted to execute a media player program for playing the content. Each of the first, second, third and fourth portable units 104, 106, 108, 110 is external to the computer 102 and can wirelessly communicate with the computer 102 and with each other. The first portable unit 104 has a housing 112 in the shape of a smooth-edged stone, and has no electro-mechanical controls, such as for example, no knobs, dials, levers or buttons, for controlling the operation of the first portable unit 104, thus providing an aesthetically-pleasing appearance. The second, third and fourth portable units 106, 108, 110 have a similar exterior appearance. However other embodiments include housings having other shapes or geometries.

The computer 102 includes a base unit 114 that encloses circuitry (not shown) for use in playing the content and for wirelessly controlling the operation of the portable units 104-110. The computer 102 further includes a touchscreen display 116 responsive to a user input device (such as, for example, a digital pen, a pointer or a user's finger) (not shown) and in electrical communication with the base unit circuitry. The display 116 is mounted on the base unit 114 and has a horizontal display surface 118. The base unit electrical circuitry and the display 116 cooperate to present a GUI that is configured for operation of the computer 102. Accordingly, the base unit 114 has no electro-mechanical controls, such as for example, no knobs, levers, dials or buttons, for controlling the selection of the content to be played or for controlling the operation of the portable units 104-110.

Each of the portable units 104-110 includes one or more data storage devices (not shown) for storing the content data, such as for example MP3 data files, for use by the computer 102 in playing the content. The first portable unit 104 includes a hard disk drive, the second portable unit 106 includes an optical drive, such as a CD or DVD drive, the third portable unit 108 includes a flash memory and the fourth portable unit 110 comprises a portable audio player having either a hard disk drive or a flash memory. Each of these portable units 104-110 can wirelessly transfer the content to each other and to the computer 102, and can wirelessly receive the content from the computer 102.

Each of the portable units 104-110 automatically and wirelessly communicates with the computer 102 when the portable unit is placed upon the horizontal surface 118 of the touchscreen display 116. Power for each portable unit is obtained from a replaceable battery or from a rechargeable battery that can obtain its power from the touchscreen 116 or the base unit 114 via inductive coupling.

When the portable units 104-110 are placed on the horizontal display surface 118, they can be controlled by the computer 102. The user input device interacts with the touchscreen display 116 to operate the GUI whereby commands are entered for controlling the portable units 104-110, for selecting the content to be played, etc. Thus, available commands include commands for causing any one of the portable units to wirelessly transfer the content to any other of the portable units, and to cause any one of the portable units to wirelessly transfer the content to the computer 102 or receive the content from the computer 102.

Figure 2:
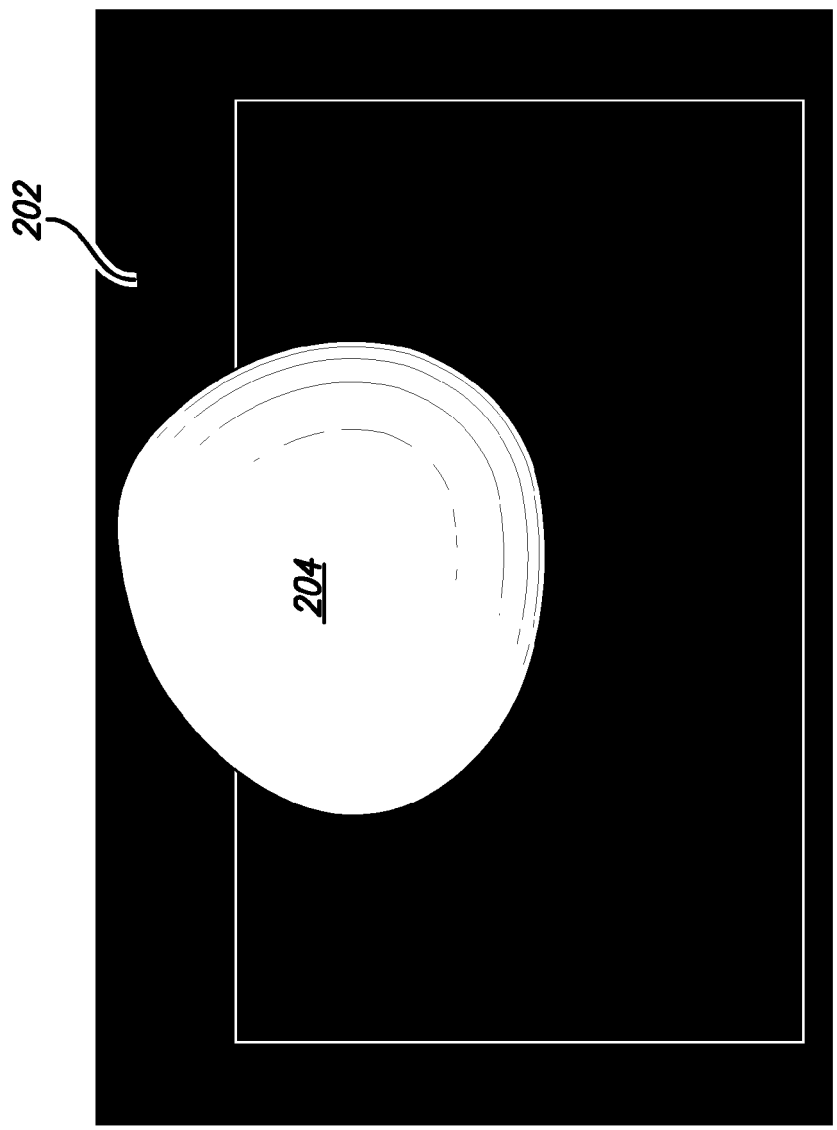
FIGS. 2-3 show a touchscreen and a graphical user interface with a portable unit in accordance with another embodiment of the invention.
Figure 3:
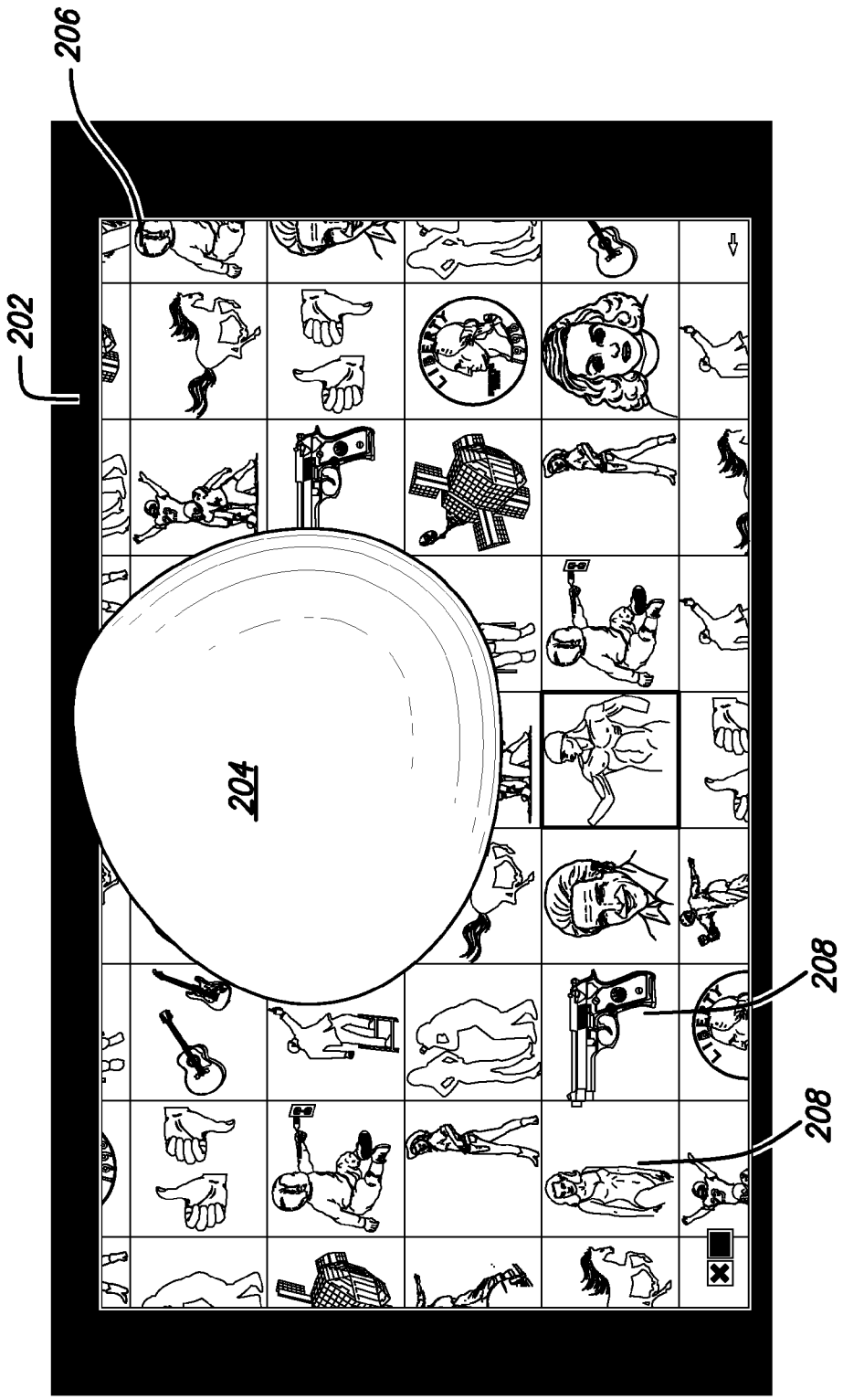

In another embodiment shown in FIGS. 2-3, a GUI appears into view in response to the use of a portable unit, such as one of the portable units 104-110 of FIG. 1. First, a touchscreen 202, that initially has no portable unit placed on the touchscreen, is initially blank and remains blank at the instant that a portable unit 204 is placed upon it. (FIG. 2) The touchscreen 202 is blank at this point in time, because no user command has been entered for a predetermined period of time, or because the system has just been powered on. (Alternatively, the touchscreen 202 displays a screensaver when the system power is on but no user command has been entered for the predetermined period of time.) However, shortly after the portable unit 204 is placed on the touchscreen 202, the presence of the portable unit 204 is automatically detected whereupon the computer causes a GUI 206 to appear into view. (FIG. 3) In this embodiment, the GUI 206 includes a plurality of thumbnails 208 representing the identity of the available content for playing.

According to yet another embodiment, each portable unit further includes a light that automatically energizes when the portable unit is operating and automatically deenergizes when the portable unit is dormant. The light is located within the housing and causes light waves to travel through a translucent portion of the housing having a pattern thereon, such as a company logo, that can be made to appear when the portable unit is operating.

Figure 4:
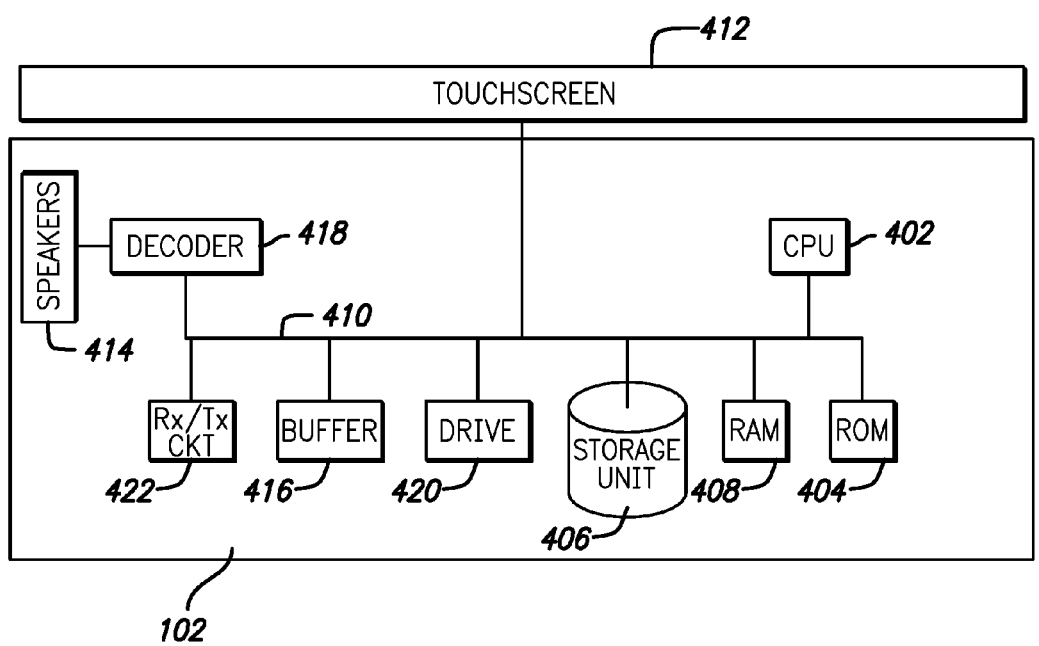
FIG. 4 is a simplified component diagram of the computer of FIG. 1.

FIG. 4 illustrates an exemplary configuration of the computer 102 or audio player of FIG. 1 according to an embodiment of the invention. Referring to FIG. 4, a central processing unit (CPU) 402 executes a variety of processing operations as directed by programs stored in a read only memory (ROM) 404 or loaded from a storage unit 406 into a random access memory (RAM) 408. The RAM 408 also stores data and so on necessary for the CPU 402 to execute a variety of processing operations as required.

The CPU 402, the ROM 404, and the RAM 408 are interconnected via a bus 410. The bus 410 further connects an input-output device 412 composed of a touchscreen interface, an output device composed of a set of speakers 414 for example, and the storage unit 406 based on a hard disk drive for example.

The ROM 404, RAM 408 and/or the storage unit 406 stores operating software used to enable operation of the computer 102. The storage unit 406 transfers information with the CPU 402 to store and delete information. A buffer 416 receives and buffers sequential portions of streaming content when received via a network, such as the Internet (not shown) or via other streaming sources. The content is sent to a decoder 418 which decodes, and if necessary decrypts, the content prior to sending it to the one or more speakers 414.

The bus 410 is also connected with a drive 420 as required on which a magnetic disk, an optical disk, a magneto-optical disk, or a semiconductor memory for example is loaded for content data, computer programs or other data read from any of these recording media being installed into the storage unit 406 or for playing via the speakers 414. Wireless transceiver (Rx/Tx) circuitry 422 is also connected to the bus 410 and is used to communicate with a portable unit, such as one of the portable units 104-110 of FIG. 1, as well as other wireless components as may be desired for communication with the computer 102.

Although not shown, the portable units, such as the portable units 104-110 of FIG. 1, are also configured as special purpose computers which have basically a similar configuration as that of the computer 102 shown in FIG. 4, except that some of the portable units may not have certain components, such as a decoder, a buffer, a driver, a touchscreen, speakers (in some instances), etc. As previously mentioned however, the portable units are adapted for wireless communications with the computer 102 and with each other.

While FIG. 4 shows one configuration of the computer 102 in the form of an audio player panel, alternative embodiments include the computer being a general purpose computer, a portable playback device, a television or any other type of a computer device, for playing not only audio content, but also visual content or audio-visual content. For example, other input/output devices may include a proximity display screen, a holographic display or a projector display. A proximity display screen is similar to a touchscreen, but differs in that it accepts commands from a user's finger or pointer device that is disposed close to the screen surface but does not touch it. Holographic displays and projection displays provide a GUI in the air or on a surface of a wall or paper, as the case may be. They accept user commands from a pointer device or user's finger that is disposed in the same air space as is occupied by the projected GUI.

Figure 5:
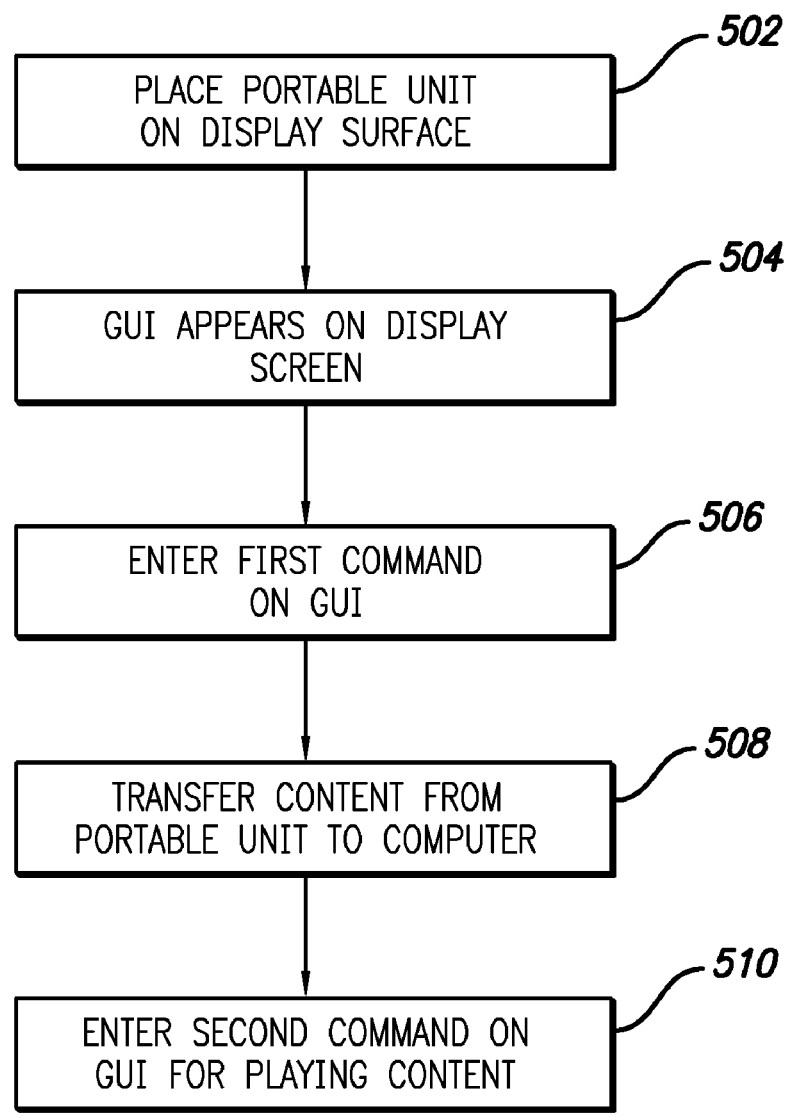
FIG. 5 is a flow diagram showing a method of playing content according to an embodiment of the invention.

FIG. 5 is a flow diagram showing a method of playing content according to an embodiment of the invention. First, a portable unit is placed on a horizontal display surface of a computer display of a computer. (Step 502) The computer causes a GUI to appear on the computer display in response to the placement of the portable unit on the horizontal display surface. (Step 504) A first command is entered by a user on the GUI (step 506) which causes the portable unit to wirelessly transfer the content from the portable unit to the computer. (Step 508) Then, a second command is entered on the GUI that causes the computer to play the content. (Step 510)

Figure 6:
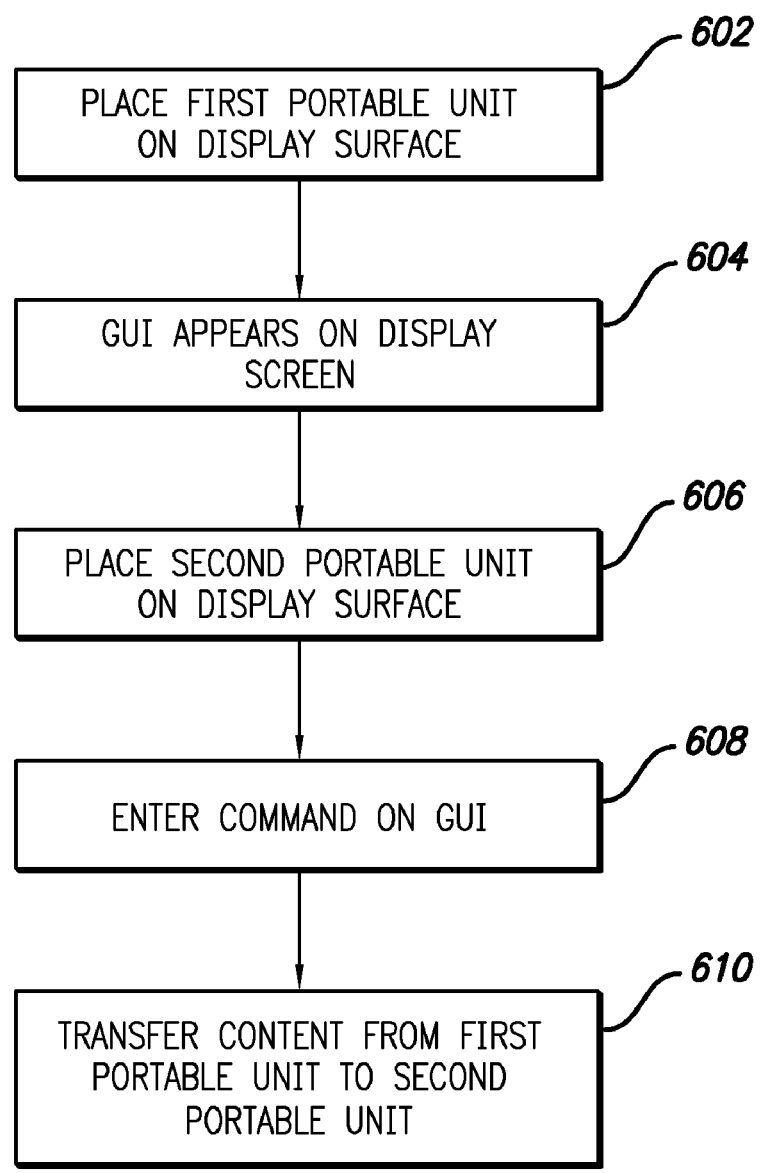
FIG. 6 is a flow diagram showing a method of transferring content according to an embodiment of the invention.

FIG. 6 is a flow diagram showing a method of transferring content, such as audio content, visual content or audio-visual content, between portable units or devices. A first portable unit is placed on a horizontal display surface of a computer display. (Step 602) The first portable unit is adapted for wireless communications with the computer. A GUI is displayed on the computer display in response to the placement of the first portable unit on the horizontal display surface. (Step 604) A second portable unit that is adapted for wireless communications with the computer is placed on the horizontal display surface. (Step 606) A command is entered on the GUI by a user (step 608) which causes the first portable unit to wirelessly transfer the content from the first portable unit to the second portable unit. (Step 610)

Thus disclosed is a system for playing audio content, visual content, or audio-visual content. According to one embodiment, a base panel or computer incorporates loudspeakers, amplifiers, a display/control surface, charging circuitry for any objects placed upon the display surface, and capacitive sensors to display and control the user interface. Also included are one or more portable units having housings in the shape of aesthetically-pleasing structures, such as for example, the shape of a stone having smooth, curved surfaces. These portable units include data storage components (such as hard disk drives, optical drives, flash memories, etc.) for storing the content to be played, and incorporate electronics within but have no visible controls. As the portable units are placed at any location on the display surface, a GUI automatically appears under and around the units, indicating content, controls, etc. Commands can be entered on the GUI for controlling the transfer of the content from or to the portable units and for controlling the playing of the content by the base panel.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. A system for playing content wherein the content is one of audio content, visual content and audio-visual content, the system comprising:
   a media player program for playing the content;
   a computer adapted to execute the media player program; and
   a first portable unit adapted for wireless communications with the computer,
   wherein the computer comprises:
      circuitry for use in playing the content;
      a display in electrical communication with the circuitry and having a horizontal display surface, wherein the display is adapted for presenting a graphical user interface (GUI) configured for operation of the computer; and
      a base unit that encloses the circuitry, wherein the display is mounted on the base unit, and wherein the base unit has no electro-mechanical control for controlling one of the selection of the content to be played and the operation of the first portable unit,
   wherein the computer is configured to cause the GUI to appear on the display in response to the placement of the first portable unit on the display surface,
   wherein the first portable unit is controlled by commands entered on the GUI, and
   wherein the first portable unit is adapted to store the content and to wirelessly transfer the content to the computer.

2. The system of claim 1, wherein the computer is configured to cause the GUI to appear on the display in response to the placement of the first portable unit on any location on the display surface.

3. The system of claim 1, wherein the system is further for use with a user input device and wherein the display is a touchscreen display responsive to the user input device.

4. The system of claim 1, wherein the first portable unit has a housing and wherein the housing is in the shape of a smooth-edged stone.

5. The system of claim 1, wherein the first portable unit has no electro-mechanical control for controlling the operation of the first portable unit.

6. The system of claim 1, wherein the first portable unit includes a light that automatically energizes when the first portable unit is operating and automatically deenergizes when the first portable unit is dormant.

7. The system of claim 1, wherein the first portable unit comprises one of a hard disk drive, an optical drive, and a flash memory.

8. The system of claim 1, wherein the first portable unit comprises a portable audio player.

9. The system of claim 1, further comprising a second portable unit adapted for wireless communications with the computer,
   wherein the computer is configured to cause the GUI to appear on the display in response to the placement of the second portable unit on the display surface,
   wherein the second portable unit is controlled by commands entered on the GUI, and
   wherein the second portable unit is adapted to store the content and to wirelessly transfer the content to the computer.

10. The system of claim 9, wherein the computer is adapted to cause the first portable unit to wirelessly transfer the content from the first portable unit to the second portable unit.

11. The system of claim 9, wherein the first portable unit comprises one of a hard disk drive, an optical drive, and a flash memory, and wherein the second portable unit comprises another one of the hard disk drive, the optical drive, and the flash memory.

12. The system of claim 9, wherein one of the first and second portable units comprises a portable audio player.

13. A system for playing content wherein the content is one of audio content, visual content and audio-visual content, and wherein the system is further for use with a user input device, the system comprising:
   a media player program for playing the content;
   a computer adapted to execute the media player program; and
   a portable unit adapted for wireless communications with the computer,
   wherein the computer comprises:
      circuitry for use in playing the content;
      a base unit that encloses the circuitry and
      a display in electrical communication with the circuitry and having a horizontal display surface, wherein the display is mounted on the base unit and is adapted for presenting a graphical user interface (GUI) configured for operation of the computer, and wherein the display is a touch screen display responsive to the user input device,
   wherein the portable unit is adapted to store the content and to wirelessly transfer the content to the computer,
   wherein the base unit has no electro-mechanical control for controlling one of the selection of the content to be played and the operation of the portable unit,
   wherein the computer is configured to cause the GUI to appear on the display in response to the placement of the portable unit on the display surface, and
   wherein the portable unit is controlled by commands entered on the GUI.

14. The system of claim 13, wherein the portable unit comprises one of a hard disk drive, an optical drive, and a flash memory.

15. The system of claim 14, wherein the portable unit has no electro-mechanical control for controlling the operation of the portable unit.

16. A system for playing content wherein the content is one of audio content, visual content and audio-visual content, the system comprising:
   a media player program for playing the content;
   a computer adapted to execute the media player program; and
   means for storing the content and for wirelessly transferring the content to the computer;
   wherein the computer comprises:
      circuitry for use in playing the content;
      means for displaying a graphical user interface (GUI) configured for operation of the computer and of the storing means; and
      a base unit on which the displaying means is mounted, wherein the base unit has no electro-mechanical control for controlling one of the selection of the content to be played and the operation of the storing means, wherein the computer is configured to cause the GUI to appear on the displaying means in response to the placement of the storing means on the displaying means.

17. A method of playing content, wherein the content is one of audio content, visual content and audio-visual content, the method comprising:

placing a portable unit on a horizontal display surface of a computer display of a computer, wherein the computer is adapted to execute a media player program for playing the content;

displaying a graphical user interface (GUI) on the computer display in response to the placing of the portable unit on the horizontal display surface;

entering a first command on the GUI for causing the portable unit to wirelessly transfer the content from the portable unit to the computer; and entering a second command on the GUI for causing the computer to play the content, wherein the computer includes a base unit that encloses circuitry for use in playing the content, wherein the computer display is mounted on the base unit, and wherein the base unit has no electro-mechanical control for controlling one of the selection of the content to be played and the operation of the portable unit.

18. The method of claim 17, wherein the portable unit has no electro-mechanical control for controlling the operation of the portable unit.

19. The method of claim 17, wherein the portable unit comprises one of a hard disk drive, an optical drive, and a flash memory.

20. A method of transferring content, wherein the content is one of audio content, visual content and audio-visual content, the method comprising:

placing a first portable unit on a horizontal display surface of a computer display of a computer, wherein the first portable unit is adapted for wireless communications with the computer, and wherein the computer is adapted to execute a media player program for playing the content;

displaying a graphical user interface (GUI) on the computer display in response to the placing of the first portable unit on the horizontal display surface;

placing a second portable unit on the horizontal display surface, wherein the second portable unit is adapted for wireless communications with the computer; and entering a command on the GUI for causing the first portable unit to wirelessly transfer the content from the first portable unit to the second portable unit, wherein the computer includes a base unit that encloses circuitry for use in playing the content, wherein the computer display is mounted on the base unit, and wherein the base unit has no electro-mechanical control for controlling one of the selection of the content to be played, the operation of the first portable unit, and the operation of the second portable unit.

21. The method of claim 20, wherein the first portable unit comprises one of a hard disk drive, an optical drive, and a flash memory, and wherein the second portable unit comprises another one of the hard disk drive, the optical drive, and the flash memory.

22. The method of claim 20, wherein one of the first and second portable units comprises a portable audio player.

* * * * *